(12) United States Patent
Yamamoto (10) Patent No.: US 7,255,482 B2
(45) Date of Patent: Aug. 14, 2007

(54) BEARING APPARATUS FOR A DRIVING WHEEL OF VEHICLE

(75) Inventor: Ken Yamamoto, Shizuoka-ken (JP)

(73) Assignee: NTN Corporation (JP)

( * ) Notice: Subject to any disclaimer, the term of this patent is extended or adjusted under 35 U.S.C. 154(b) by 466 days.

(21) Appl. No.: 10/633,749

(22) Filed: Aug. 4, 2003

(65) Prior Publication Data
US 2004/0022471 A1 Feb. 5, 2004

(30) Foreign Application Priority Data
Aug. 5, 2002 (JP) ............................... 2002-227447

(51) Int. Cl.
F16C 13/00 (2006.01)

(52) U.S. Cl. ........................... 384/544; 29/256; 29/264

(58) Field of Classification Search ................ 384/544; 474/178, 182; 29/245, 256, 258–261, 263, 29/264, 266; 464/178, 182
See application file for complete search history.

(56) References Cited

U.S. PATENT DOCUMENTS

| 4,457,061 A | * | 7/1984 | Eason .......................... 29/264 |
| 4,576,503 A | * | 3/1986 | Orain .......................... 403/259 |
| 5,233,741 A | * | 8/1993 | Maynard ...................... 29/266 |
| 5,261,149 A | * | 11/1993 | Sutton .......................... 29/261 |
| 5,308,183 A | * | 5/1994 | Stegeman et al. .......... 403/259 |
| 6,712,707 B2 | * | 3/2004 | Ogura et al. ................ 464/178 |
| 2001/0016520 A1 | * | 8/2001 | Sahashi et al. ............. 464/182 |
| 2002/0044706 A1 | * | 4/2002 | Kayama et al. ............. 384/544 |
| 2002/0048419 A1 | * | 4/2002 | Inoue et al. ................ 384/544 |
| 2002/0068639 A1 | * | 6/2002 | Tajima et al. ............... 464/178 |

FOREIGN PATENT DOCUMENTS

WO WO 02/28668 * 4/2002

* cited by examiner

*Primary Examiner*—William C. Joyce
(74) *Attorney, Agent, or Firm*—Harness, Dickey & Pierce, P.L.C.

(57) ABSTRACT

A bearing apparatus for a vehicle driving wheel has a pre-loading mechanism formed in the serration fitted portion between the stem portion of the outer joint member and the wheel hub. A fastening member combines the wheel hub and the outer joint member. A releasing member, adapted to be arranged on the wheel hub, enables removal of the fastening mechanism.

4 Claims, 11 Drawing Sheets

PRIOR ART

Fig. 12

PRIOR ART

Fig. 13

BEARING APPARATUS FOR A DRIVING WHEEL OF VEHICLE

CROSS-REFERENCE TO RELATED APPLICATIONS

This application claims priority to Japanese Patent Application No. 2002-227447 filed Aug. 5, 2002, which application is herein expressly incorporated by reference.

FIELD OF THE INVENTION

The present invention relates to a bearing apparatus for rotatably supporting a driving wheel of a vehicle.

BACKGROUND OF THE INVENTION

Figure 13:
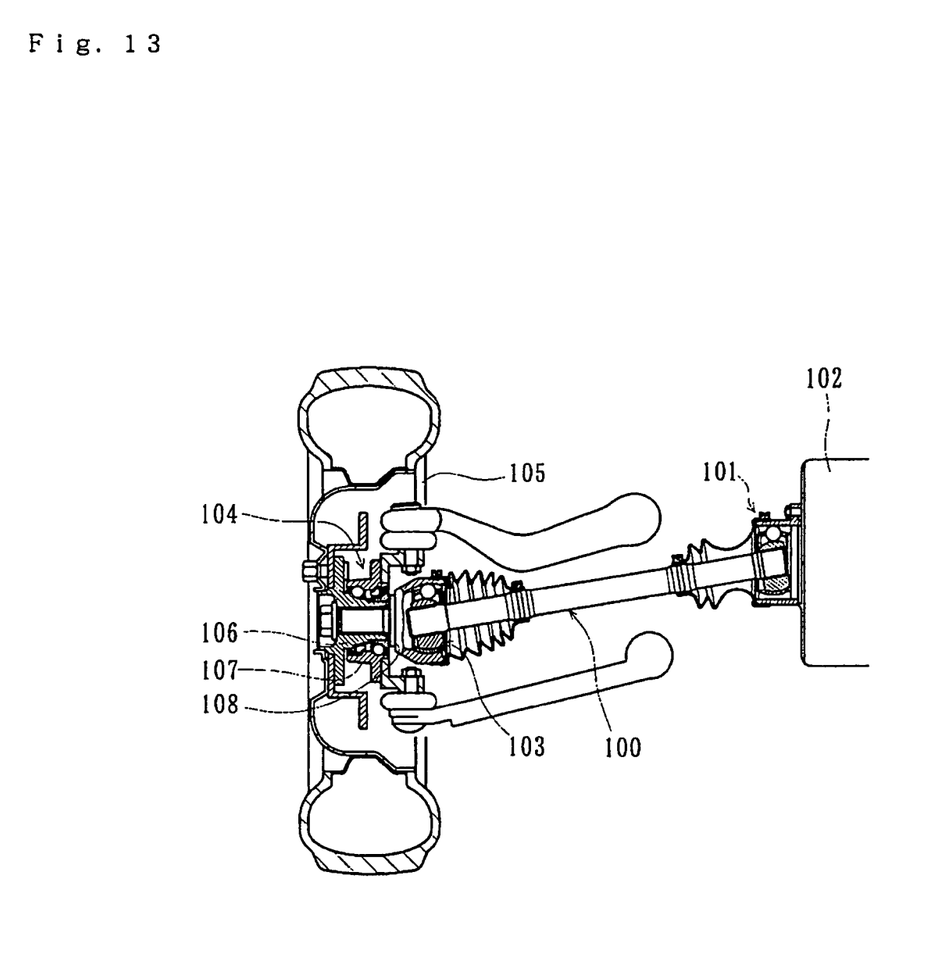
FIG. 13 is a longitudinal section view showing one example of power transmission apparatus into which a bearing apparatus for a driving wheel is incorporated.

A power transmission apparatus transmits power from the vehicle engine to the vehicle wheels. The apparatus enables radial, axial and moment displacements caused by the bound of wheels and the turning of the vehicle during travel. The apparatus includes a drive shaft 100 arranged between the engine and the driving wheel. One end of the drive shaft 100 is connected to a differential gear 102 via a slidable constant velocity universal joint 101. The other end of the drive shaft is connected to a wheel 105 via a bearing apparatus 104 which includes a fixed type constant velocity universal joint 103, as shown in FIG. 13.

Figure 11:
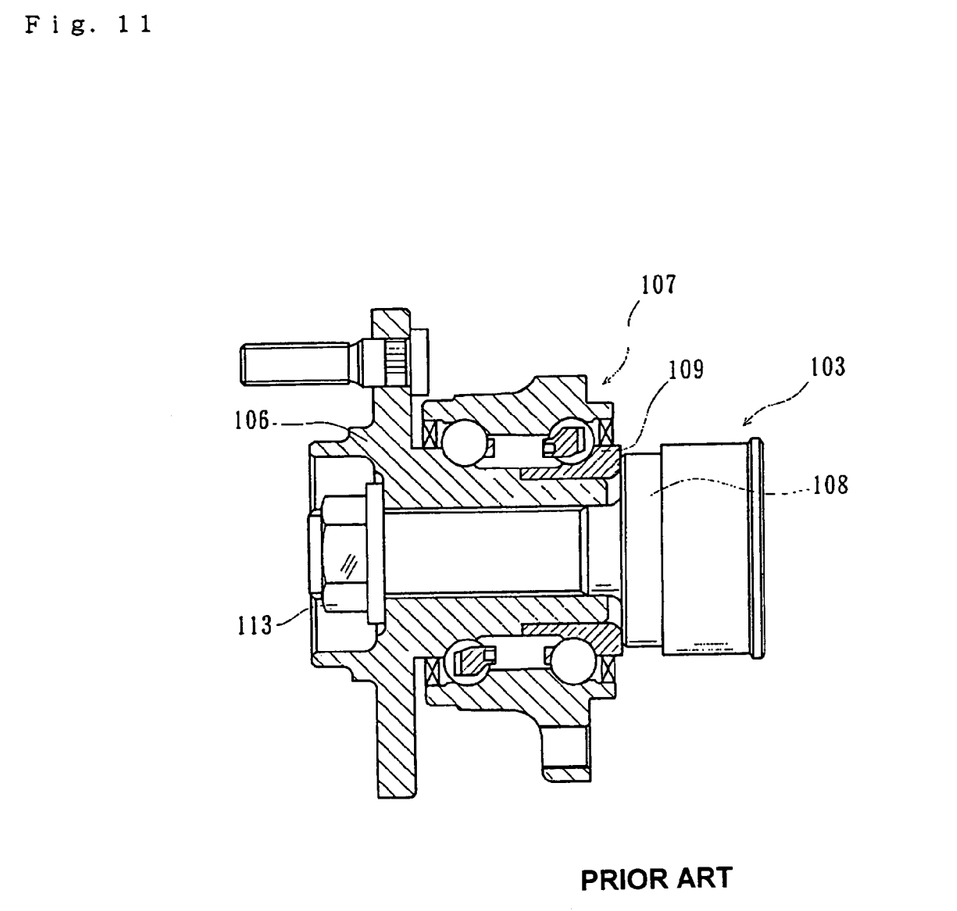
FIG. 11 is a longitudinal section view showing a bearing apparatus for a driving wheel of the prior art.

A prior art bearing apparatus 104 for a vehicle driving wheel is shown in FIG. 11. The apparatus 104 includes a wheel hub 106 for mounting the wheel 105, a double row rolling bearing 107 for rotatably support the wheel hub 106 and a fixed type constant velocity universal joint 103. The universal joint 103 is adapted to be connected to the wheel hub 106 to transmits the power to the wheel hub.

It is known that torsion is created in the drive shaft 100 by a large torque from the engine, via the slidable constant velocity universal joint 101, at a low engine speed, such as during starting movement of a vehicle. As a result, torsion is also created on an inner ring 109 of the double row rolling bearing 107 which supports the driving shaft 100. A stick-slip noise is generated at the abutting surfaces between the outer joint member 108 and the inner ring 109 due to radical slip therebetween when a large amount of torsion exist in the driving shaft 100.

Figure 12:
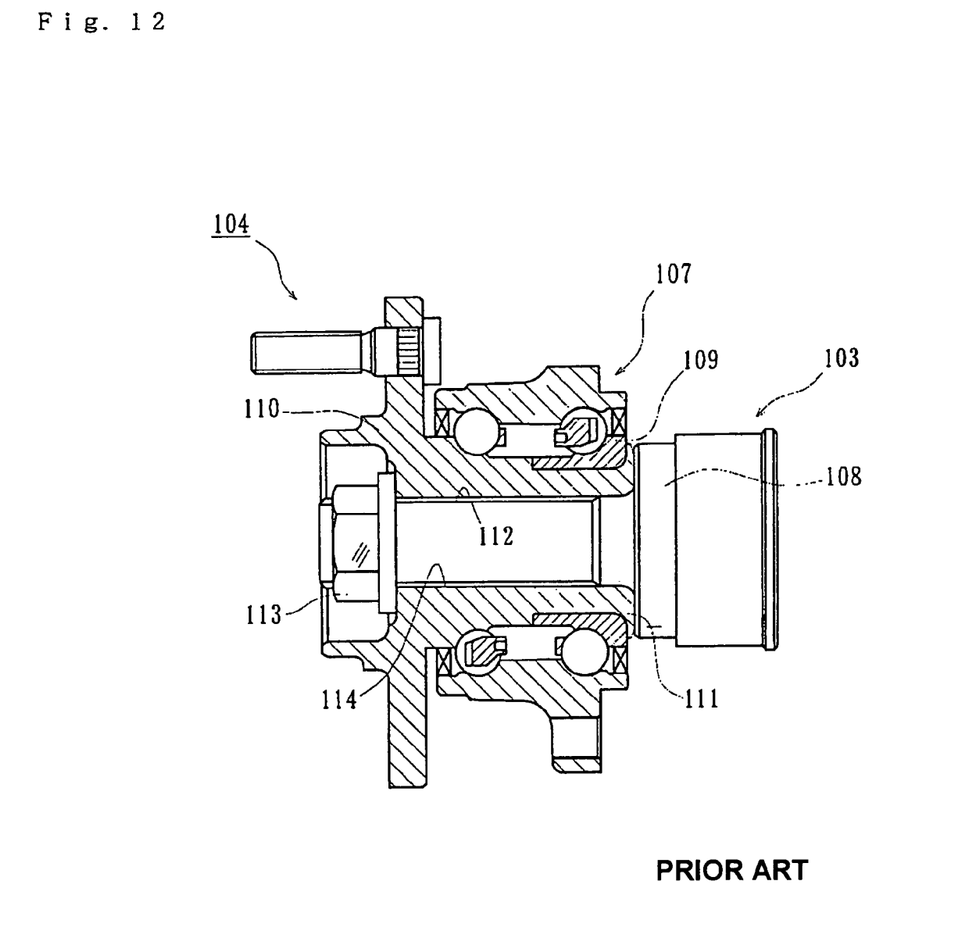
FIG. 12 is a longitudinal section view showing another bearing apparatus for a driving wheel of the prior art.

A bearing apparatus for a vehicle driving wheel is known for example from Japanese Laid open publication No. 5404/1999. The bearing apparatus has a wheel hub 110 on which the inner ring 109 is fitted. The inner wheel 109 is axially secured by a caulked portion 111 formed on the inner end portion of the wheel hub 110. The wheel hub 110 and the outer joint member 108 are united by a nut 113. The outer joint member 108 is fitted in the wheel hub 110 via the serration 112. The shoulder of the outer joint member 108 is abutted to the inner end surface of the caulked portion 111.

Accordingly, the pre-load of the double row rolling bearing 107 can be easily controlled and maintained without strongly fastening the nut 113 as in a conventional manner and also without strictly controlling the fastening torque. In addition, the wheel hub 110 and the outer joint member 108 can be united by lightly tightening the nut 113. Therefore it is possible to prevent generation of the stick-slip noise at the abutting surfaces between the inner ring 109 and the outer joint member 108 although the torsion would be caused on the outer joint member 108. However, in such a bearing apparatus for a driving wheel, noise generation or loosening of the nut 113 is sometimes caused during rapid acceleration and deceleration times when circumferential backlash occurs in the fitted portion of the serration 112. In order to resolve this problem, a helix angle is provided in the serration 112 of the outer joint member 108. The serration 112 is press fit into the serration 114 of the wheel hub 110 to eliminate the circumferential backlash in the fitted portion. In such a construction, a problem exists in that a machine, such as a press or the like, is required to assemble or disassemble the wheel hub 110 and the outer joint member 108. This reduces the working efficiency.

While this structure can maintain the pre-load of the rolling bearing 107 lightly tightened to the nut 113, another problem is created. A small gap is created at the abutted portion between the wheel hub 110 and the outer joint member 108. This lowers the sealing performance. If rain water penetrates into the bearing, the serration fitted portion will be rigidly seized by rust, which also reduces the working efficiency.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

SUMMARY OF THE INVENTION

It is an object of the present invention to provide a bearing apparatus for a vehicle driving wheel which has high reliability and an excellent maintenance ability. Thus, a high working efficiency exist in assembling and disassembling the bearing apparatus.

To achieve the objects of the present invention, a bearing apparatus for a vehicle driving wheel is provided with a double row rolling bearing. A wheel hub is integrally formed with a wheel mounting flange at one end of the double row rolling bearing. A cylindrical stepped portion of smaller diameter axially extends from the other end of the wheel hub. An inner ring is fitted on the stepped portion of smaller diameter of the wheel hub. The inner ring is secured on the wheel hub through a caulked portion formed by plastically deforming the end of the stepped portion radially outwardly. An outer joint member has a shoulder adapted to be abutted to the end surface of the caulked portion. A stem portion axially extends from the shoulder. The outer joint member is inserted in the wheel hub, via a serration fitted portion, to attain a detachable engagement with the wheel hub. The bearing apparatus further comprises a pre-loading mechanism formed in the serration fitted portion between the stem portion of the outer joint member and the wheel hub. A fastening mechanism combines the wheel hub and the outer joint member. A releasing mechanism is adapted to be arranged on the wheel hub to remove the fastening mechanism.

According to the provision of the pre-loading mechanism formed in the serration fitted portion between the stem portion of the outer joint member and the wheel hub, it is possible to eliminate circumferential backlash and prevent noise generation at rapid acceleration and deceleration times of the vehicle as well as the loosening of the bolt due to the circumferential backlash. In addition it is possible to easily disassemble the bearing apparatus although the serration of the stem portion and the wheel hub is fitted in the pre-load condition. This is due to the provision of the releasing mechanism adapted to be arranged on the wheel hub to remove the fastening mechanism.

According to the present invention, the serration fitted portion is pre-loaded by providing a helix angle on the serration of the stem portion of the outer joint member. The helix angle has a predetermined angle relative to the axis of the stem portion. This structure provides the pre-load in the serration fitted portion in order to prevent circumferential backlash. This, in turn, prevents noise generation at rapid acceleration and deceleration times of vehicle as well as the loosening of the bolt due to the circumferential backlash. In addition, it is possible to improve sealing performance by preventing fretting abrasion at the caulked portion and the shoulder of the outer joint member.

According to the present invention, the outer end surface of the wheel hub is formed with an internal thread. The wheel hub and the outer joint member are united by a plate. The plate has a circular aperture formed at a position corresponding to the internal thread. A central aperture is formed with an internal thread. The plate abuts the outer end surface of the wheel hub. A securing bolt is screwed into an internal thread formed in the shaft of the outer joint member through the central aperture of the plate. This structure makes it possible to reduce the weight of the bearing apparatus as well as to easily disassemble the bearing apparatus. This improves the working efficiency in assembling and disassembling the bearing apparatus even though the serration of the stem portion and the wheel hub is fitted in the pre-load condition.

According to the present invention, the releasing mechanism includes a releasing jig formed with an external thread. An internal thread, which engages the external thread of the releasing jig, is formed on a pilot portion of the wheel hub. Accordingly, it is possible to separate the wheel hub and only mount the releasing jig on the wheel hub by screwing the bolt into the internal thread formed in the center of the releasing jig. Thus, it is possible to improve the working efficiency of assembly and disassembly of the bearing apparatus even though the serration of the stem portion and the wheel hub is fitted in the pre-load condition.

According to the present invention, the outer end portion of the wheel hub is formed with an annular recess with a tapered internal circumferential surface. The annular recess receives a fastening member formed with a serration on its inner circumferential surface. The diameter of the fastening member is reduced by screwing a securing bolt into an internal thread formed in the stem portion of the outer joint member. Since the fastening member applies the pre-load at the serration fitted portion, it is possible to unite and to pre-load the stem portion and the wheel hub without providing the pre-loading mechanism between the serration fitted portion.

According to the present invention, the fastening member is a split ring formed with slits arranged along its circumference. Alternatively, the fastening member is formed as a plurality of circumferentially separated parts. This structure reduces the diameter of the fastening member.

More particularly, according to the present invention, a plurality of slits are formed on either the inner or outer circumferential surface of the fastening member. This structure reduces the diameter of the fastening member and thus also improves the working efficiency during assembly and disassembly of the bearing apparatus.

According to the present invention, an elastic ring is fitted in an annular space formed between the end surface of the inner ring and the shoulder of the outer joint member. One end of a pulsar ring is arranged on the shoulder of the outer joint member engaging the elastic ring. This structure prevents the plastic ring from falling off as well as remarkably improving the sealing performance between the end surface of the inner ring and the shoulder of the outer joint member.

BRIEF DESCRIPTION OF THE DRAWINGS

The present invention will become more fully understood from the detailed description and the accompanying drawings, wherein:

FIGS. 10(a), (b) and (c) are front elevation views showing other embodiments of the fastening members;

DETAILED DESCRIPTION OF THE PREFERRED EMBODIMENTS

Figure 1:
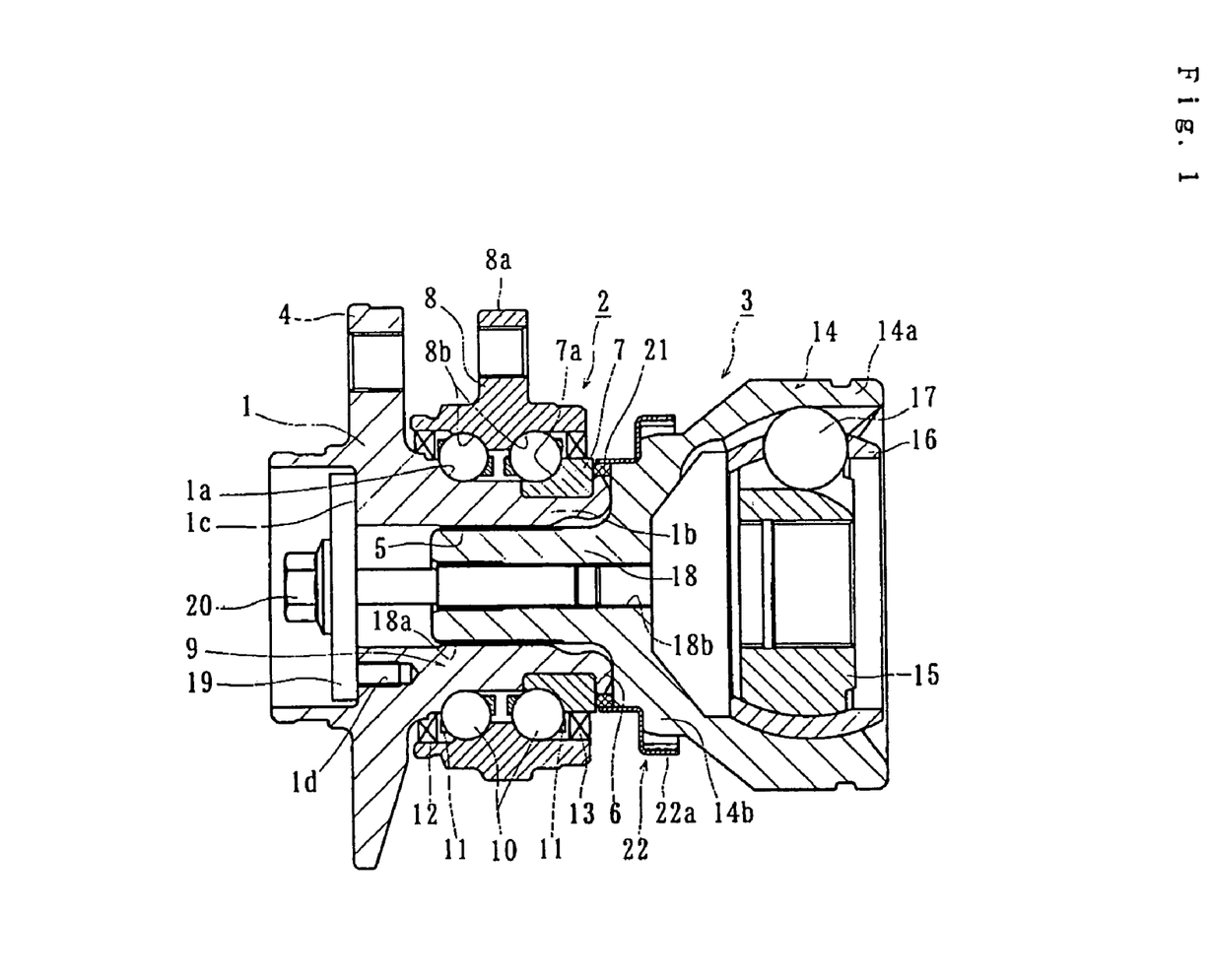
FIG. 1 is a longitudinal section view showing a first embodiment of the bearing apparatus for a driving wheel of the present invention.

Preferred embodiments of the present invention will be hereinafter described with reference to the accompanied drawings. FIG. 1 is a longitudinal section view showing a first embodiment of a bearing apparatus for a vehicle driving wheel of the present invention.

The apparatus has a wheel hub 1, a double row rolling bearing 2 and an constant velocity universal joint 3 which are assembled as a unit. In the description below, the term "outboard side" of the apparatus denotes a side which is positioned outside of the vehicle body. The term "inboard side" of the apparatus denotes a side which is positioned inside of the body when the apparatus is mounted on the vehicle body.

The wheel hub 1 is formed integrally with a wheel mounting flange 4 at the outboard side of the wheel hub 1 on which a wheel (not shown) is mounted. The wheel hub 1 has an inner raceway surface 1a at the outboard side of the double row rolling bearing 2. A cylindrical stepped portion 1b of smaller diameter axially extends from the inner raceway surface 1a. The outer circumferential surface of the wheel hub 1, from the inner raceway surface 1a to the cylindrical stepped portion 1b, is formed with a hardened layer having a surface hardness of HRC 54~64. It is preferable to use a high frequency induction heating as a heat treatment which can easily carry out a local heating and setting of the depth of a hardened layer. The end of the stepped portion is not hardened and has a surface hardness less than HRC 25 to enable the end to be plastically deformed to form caulked portion 6.

The stepped portion 1b of small diameter of the wheel hub 1 is press fit with an inner ring 7 to form a so-called "third generation" structure. The inner ring 7 is immovably secured in an axial direction. The outer circumferential surface of the inner ring 7 is formed with inner raceway surface 7a at the inboard side of the double row rolling bearing 2 to form a double row inner raceway surface of the bearing 2.

The double row rolling bearing 2 has an outer member 8, inner member 9 and a double row rolling elements 10 and 10. The outer member 8 is integrally formed on its outer circumferential surface with a body mounting flange 8a. On its bore surface, the outer member 8 has a double row outer raceway surfaces 8b and 8b. On the other hand, the inner member 9 has the wheel hub 1 and the inner ring 7. The double row rolling elements 10 and 10 are contained between the outer raceway surfaces 8b and 8b and the inner raceway surfaces 1a and 7a. The rolling elements 10 are freely rotatably held by cages 11 and 11. Seals 12 and 13 are arranged at the ends of the bearing 2 to prevent leakage of grease contained within the bearing 2 as well as ingress of rain water or dusts. The illustrated ball rolling elements 10 and 10 may be replaced for example by conical rolling elements.

The constant velocity universal joint 3 has an outer joint member 14, a joint inner ring 15, a cage 16 and torque transmitting balls 17. The outer joint member 14 has a cup-shaped mouth portion 14a, a shoulder 14b that forms the bottom of the mouth portion 14a, and a stem portion 18 which axially extends from the shoulder 14b. The outer circumferential surface of the stem portion 18 is formed with a serration (or a spline) 18a. An external thread 18b is formed on the inner circumferential surface of the stem portion 18. The serration 18a of the stem portion 18 is formed with a helix angle of a predetermined angle relative to the axis of the stem portion 18.

The serration 18a of the stem portion 18 is fitted into the serration 5 of the wheel hub 1 by inserting the stem portion 18 into the wheel hub 1 until the shoulder 14b of the outer joint member 14 abuts the inner end surface of the caulked portion 6. Thus a pre-load is caused at the fitted portion of the serrations of the wheel hub 1 and the stem portion 18 in order to eliminate circumferential backlash. Finally the wheel hub 1 and the outer joint member 14 are axially united by screwing a securing bolt 20 into the internal thread 18b via a plate 19 abutting onto the outer end surface 1c of the wheel hub 1. In this case, the stem 18 can be easily fitted into the serration 5 of the wheel hub 1 if the fitted length is less than ½~⅓ the whole length of the serration 18a of the stem portion 18. Accordingly, the stem portion 18 of the outer joint member 14 can be inserted into the wheel hub 1 by fastening the bolt 20.

Alternatively, the serration 18a of the stem portion 18, with the helix angle, in order to apply the pre-load to the fitted portion with the serration 5 of the wheel hub 1, it is possible to appropriately set the tooth thickness of the serrations 18a and 5 of the stem portion 18 and the wheel hub 1, respectively, to apply the pre-load at their fitted portions.

Figure 2:
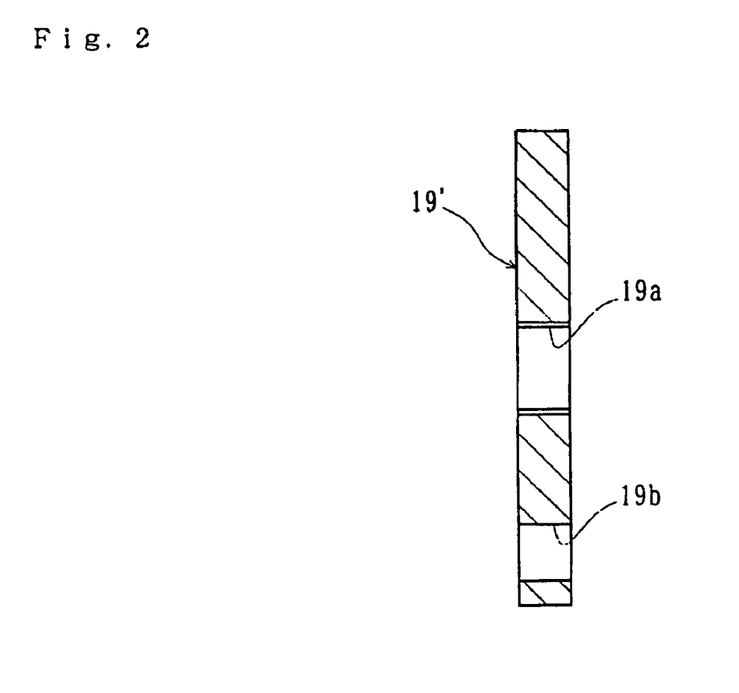
FIG. 2 is a cross section view showing a releasing jig of the present.

One embodiment of the releasing jig 19' used for disassembling the bearing apparatus to repair it is formed as a plate shaped configuration as shown in FIG. 2. The jig 19' has an internal thread 19a to engage the securing bolt 20 at the center. The jig 19' also has a plurality of circular apertures 19b near its periphery. Internal threads 1d are formed on the outer end surface of the wheel hub 1 at positions corresponding to those of the circular apertures 19b of the releasing jig 19'.

Figure 3:
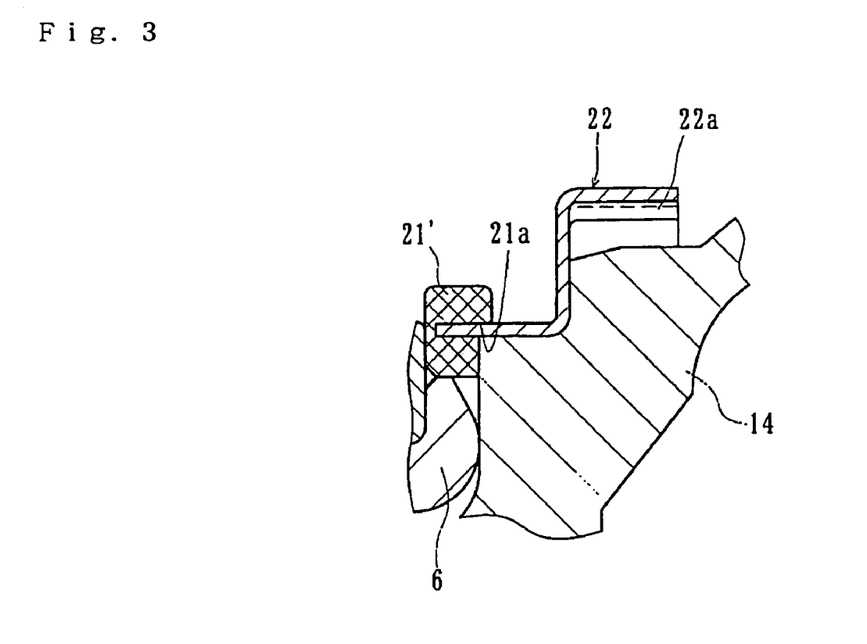
FIG. 3 is an enlarged partial cross section view of FIG. 1 of the bearing apparatus for a driving wheel of the present invention.

An elastic ring 21 is inserted around the caulked portion 6 of the wheel hub 1 in an annular space formed between the inner ring 7 and the shoulder 14b. The elastic ring 21 is pressed down by a pulsar ring 22 for ABS (Anti-lock Brake System) press fit onto the outer circumferential surface of the shoulder 14b to prevent the elastic ring 21 from coming out of the annular space. The pulsar ring 22 is formed by press forming a steel plate and is formed with a plurality of irregularities 22a to detect the rotation speed using an oppositely arranged sensor. The pulsar ring may be integrally heat bonded to the elastic ring or may be inserted into an annular recess 21a formed in the elastic ring 21' as shown in FIG. 3.

According to this embodiment, the rolling bearing adopts a so-called "self-retain structure" in which the inside gap of the rolling bearing 2 is a negative gap to improve the rigidity of the bearing. The inner ring 7 is axially secured by the caulked portion to maintain the negative gap. Accordingly, this structure makes it possible, not only to sub-unitize the bearing portion, but to easily incorporate a bearing portion to a vehicle because it is unnecessary to control the pre-load by setting the fastening torque. In addition it is possible to prevent loosening of bolt 20 because of the application of the pre-load at the serrations 5 and 18a to eliminate the circumferential backlash. Also, it is possible to prevent ingress of rain water or dusts through a gap between the caulked portion 6 and the shoulder 14b. Furthermore, it is possible to remarkably improve the sealing performance between the caulked portion 6 and the shoulder 14b because of the presence of the elastic ring 21 inserted in the annular space formed between the inner ring 7 and the shoulder 14b.

Figure 4:
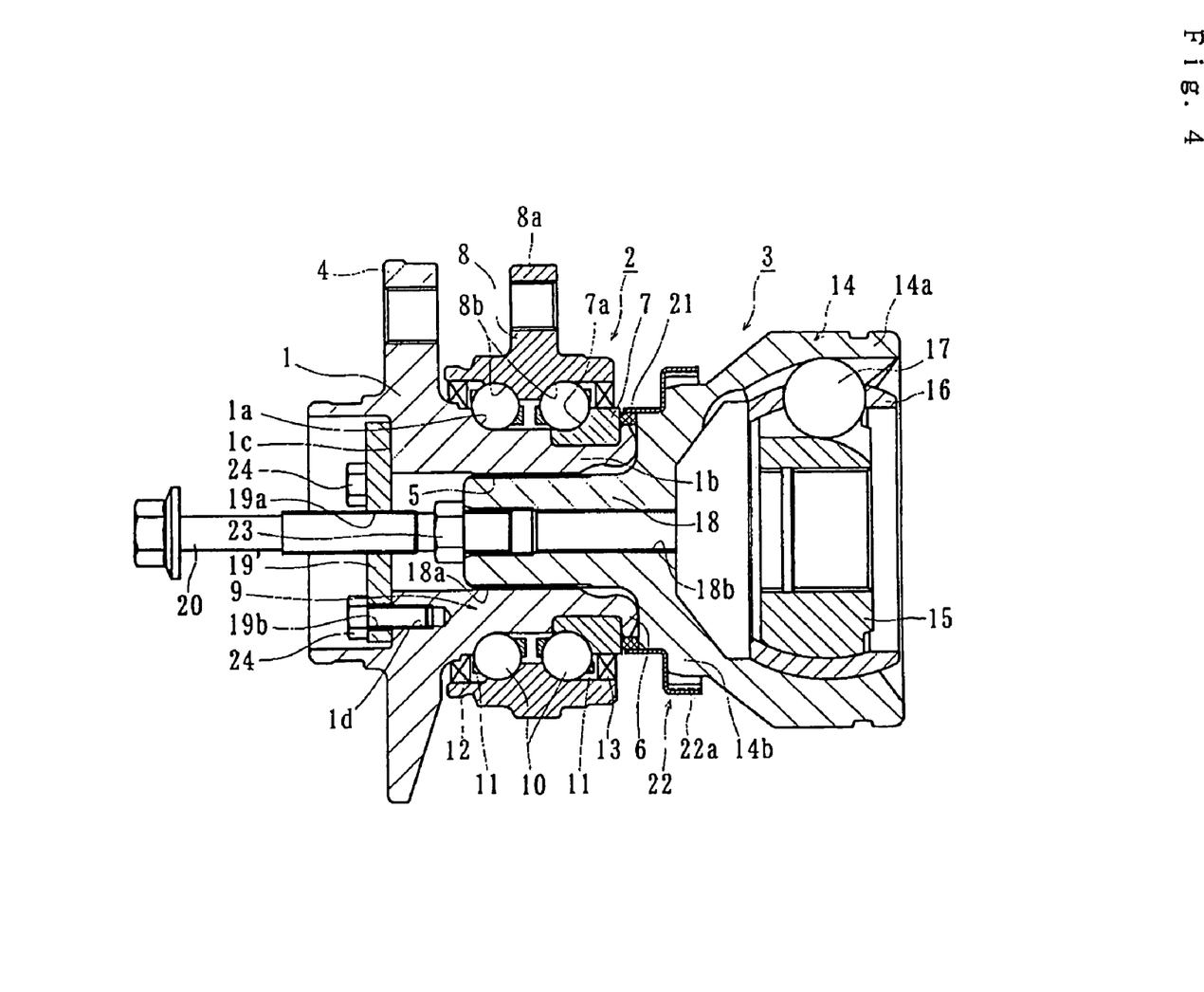
FIG. 4 is a longitudinal section view of the bearing apparatus for a driving wheel of the present invention of the first embodiment for explaining a method of disassembling.

A method for disassembling the bearing apparatus of the first embodiment will be described with reference to FIG. 4. First, the bolt 20 and the plate 19 fastened onto the outer end surface 1c of the wheel hub 1 are removed. The bolt 23 is screwed into the stem portion 18 of the outer joint member 14 in order to plug the internal threaded aperture 18b. Any member may be used in place of the bolt 23 so as to plug the aperture 18b. The releasing jig 19' is abutted onto the outer end surface 1c of the wheel hub 1 and aligning the circular aperture 19b with the internal thread 1d formed on the outer end surface 1c. The bolt 24 is screwed into the internal thread 1d so as to secure the releasing jig 19' on the outer end surface 1c. Finally, the securing bolt 20 is screwed into the internal thread 19a of the releasing jig 19'. Continuing the screwing operation, the tip end of the bolt 20 abuts on the head of bolt 23 and thus the outer joint member 14 will be gradually pushed out from the wheel hub 1. Thus, according to the bearing apparatus of the present invention, it is possible to reduce its weight and to assure its reliability compared with the bearing apparatus of the prior art. In addition it is possible to easily assemble and disassemble the bearing apparatus and thus to improve the maintenance working efficiency.

Figure 5:
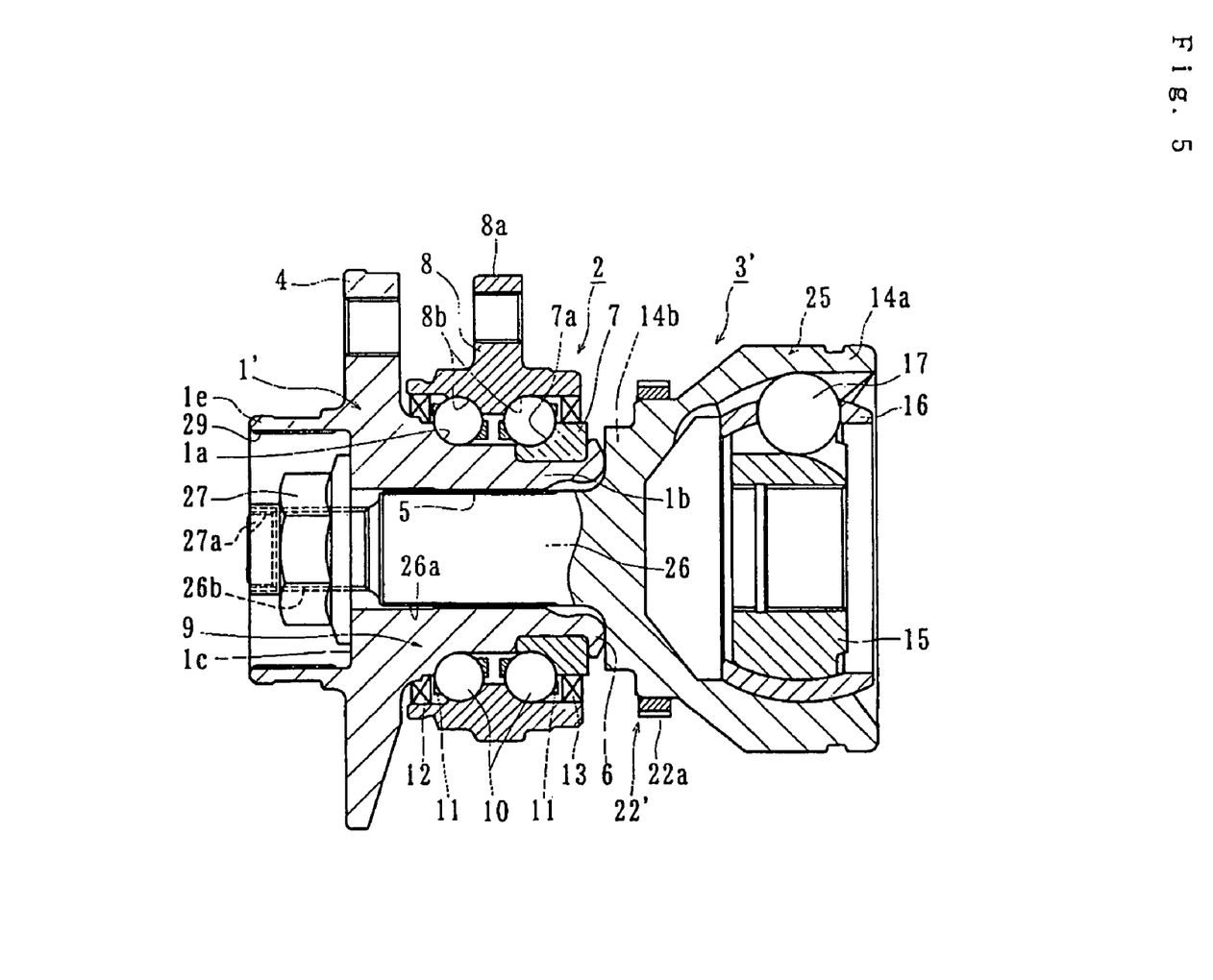
FIG. 5 is a longitudinal section view showing a second embodiment of the bearing apparatus for a driving wheel of the present invention.

FIG. 5 is a longitudinal section view showing a second embodiment of the bearing apparatus for a driving wheel of the present invention. The only difference between this embodiment and the first embodiment is in the structure of the stem portion of the outer joint member and therefore like numerals are used to designate like structure also in FIG. 5.

The stem portion 26 of the outer joint member 25 in the constant velocity universal joint 3' is formed with a serration (or spline) 26a at the circumferential surface. A threaded portion 26b is formed at the end. Similarly to the first embodiment, the helix angle is applied to the serration 26a inclined at a predetermined angle relative to the axis of the stem portion 26. In order to apply the pre-load to the fitted portion of the serrations 5 and 26a and thus eliminate circumferential backlash, the stem portion 26 is fitted into the wheel hub 1' with the serration 26a of the stem portion 26 press fit into the serration 5 of the wheel hub 1' until the shoulder 14b abuts the inner end surface of the caulked portion 6 of the wheel hub 1'. Finally the wheel 1' and the outer joint member 25 are axially united by screwing the securing nut 27 into the threaded portion 26b of the stem portion 26. A numeral 27a denotes a caulked portion to engage notched portions formed at the tip end of the stem portion 26 to form a detent of the securing nut 27.

Figure 6:
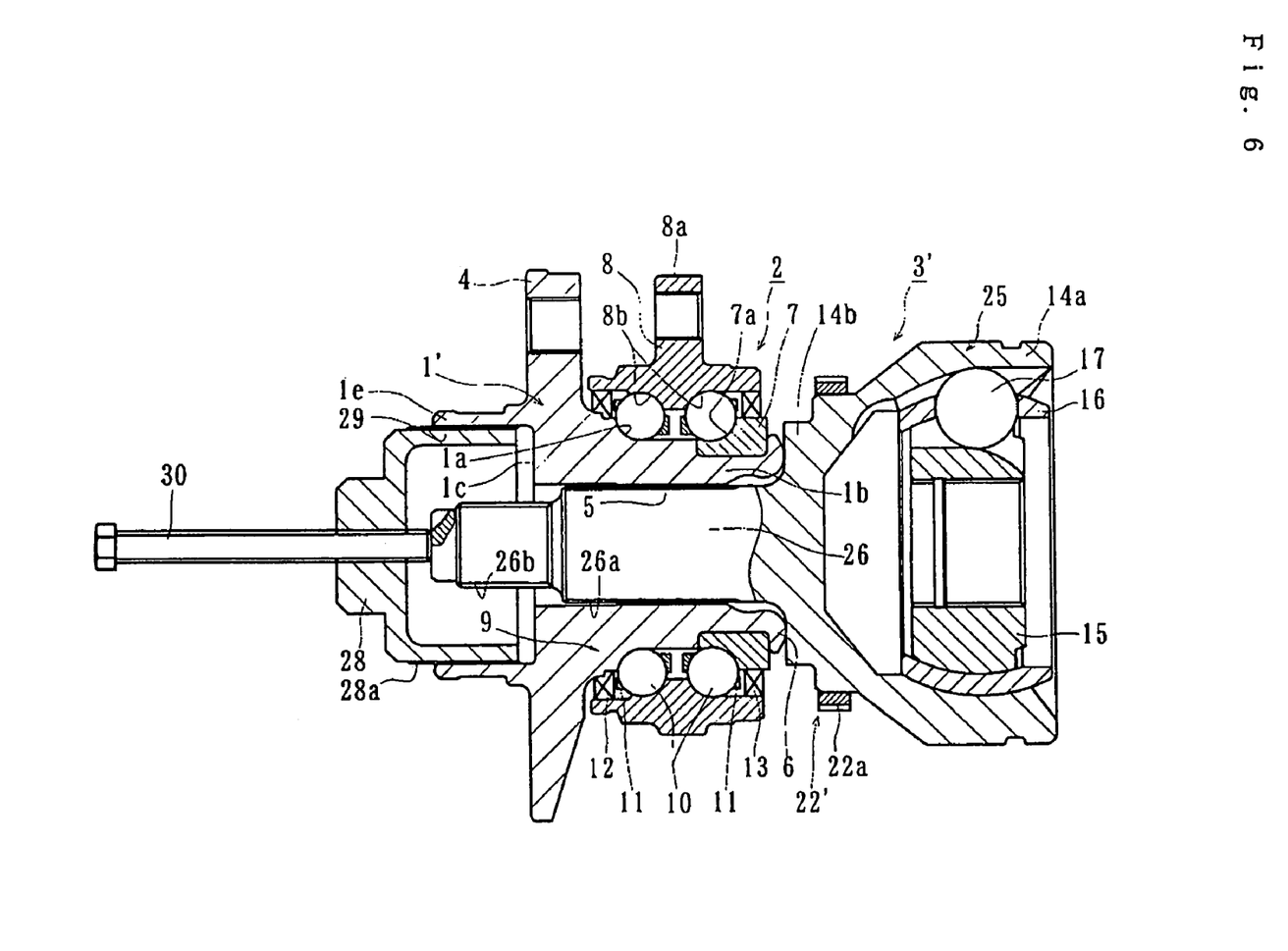
FIG. 6 is a longitudinal section view of the bearing apparatus for a driving wheel of the present invention of the second embodiment for explaining a method of disassembling.
Figure 7:
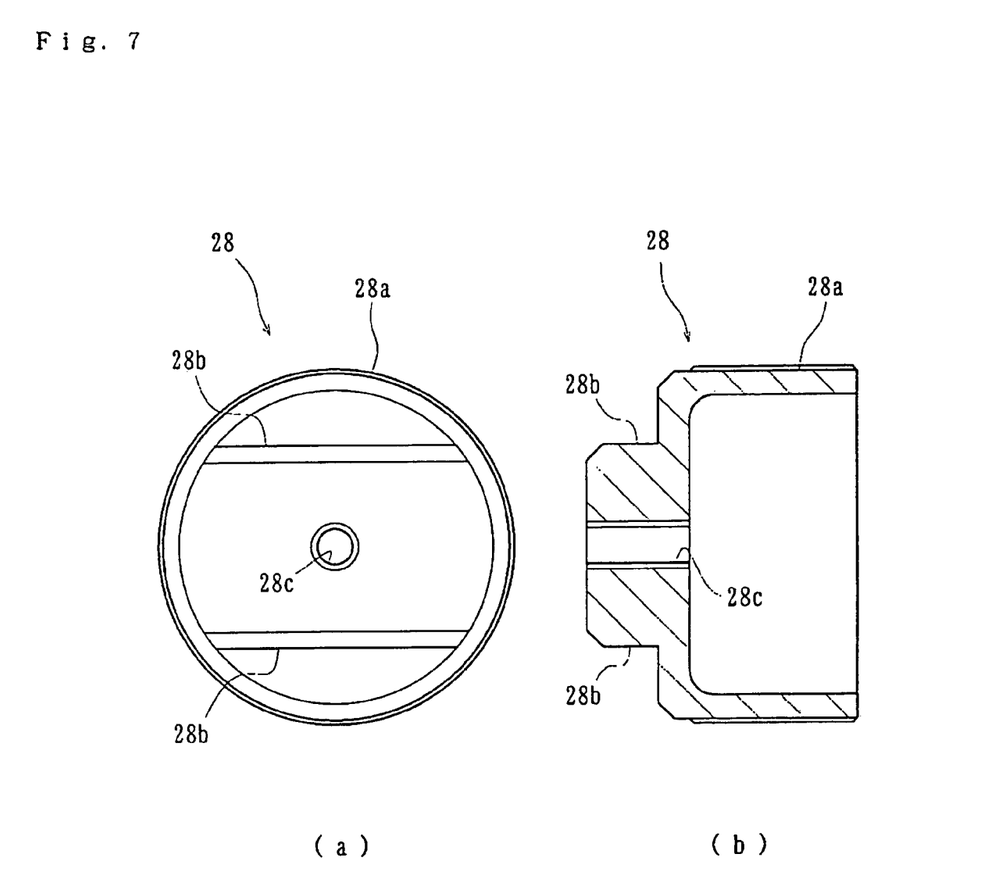
FIG. 7(a) is a front elevation view showing an another releasing jig of the present.
FIG. 7(b) is a cross section view.

A method for disassembling the bearing apparatus of the second embodiment will be described with reference to FIG. 6. First, the securing nut 27 fastened onto the outer end surface 1c of the wheel hub 1' is removed. The caulked portion 27a of the securing nut 27 is deformed. A releasing jig 28 is inserted within a pilot portion 1e of the wheel hub 1'. The inner circumferential surface is formed with an internal thread 29 and the outer circumferential surface of the releasing jig 28 is formed with an external thread 28a to engage with the internal thread 29. FIG. 7(a) is a front elevation view of the releasing jig 28. FIG. 7(b) is a cross section view. The releasing jig 28 has a generally cup-shaped configuration and is formed with a flat chamfered surface 28b on its bottom and a internal thread 28c at its center.

The bolt 30 is screwed into the internal thread 28c of the releasing jig 28. The tip end of the bolt 30 abuts the stem portion 26. Thus, the outer joint member 25 is pushed out from the wheel hub 1' so as to secure the releasing jig 19' on the outer end surface 1c.

Figure 8:
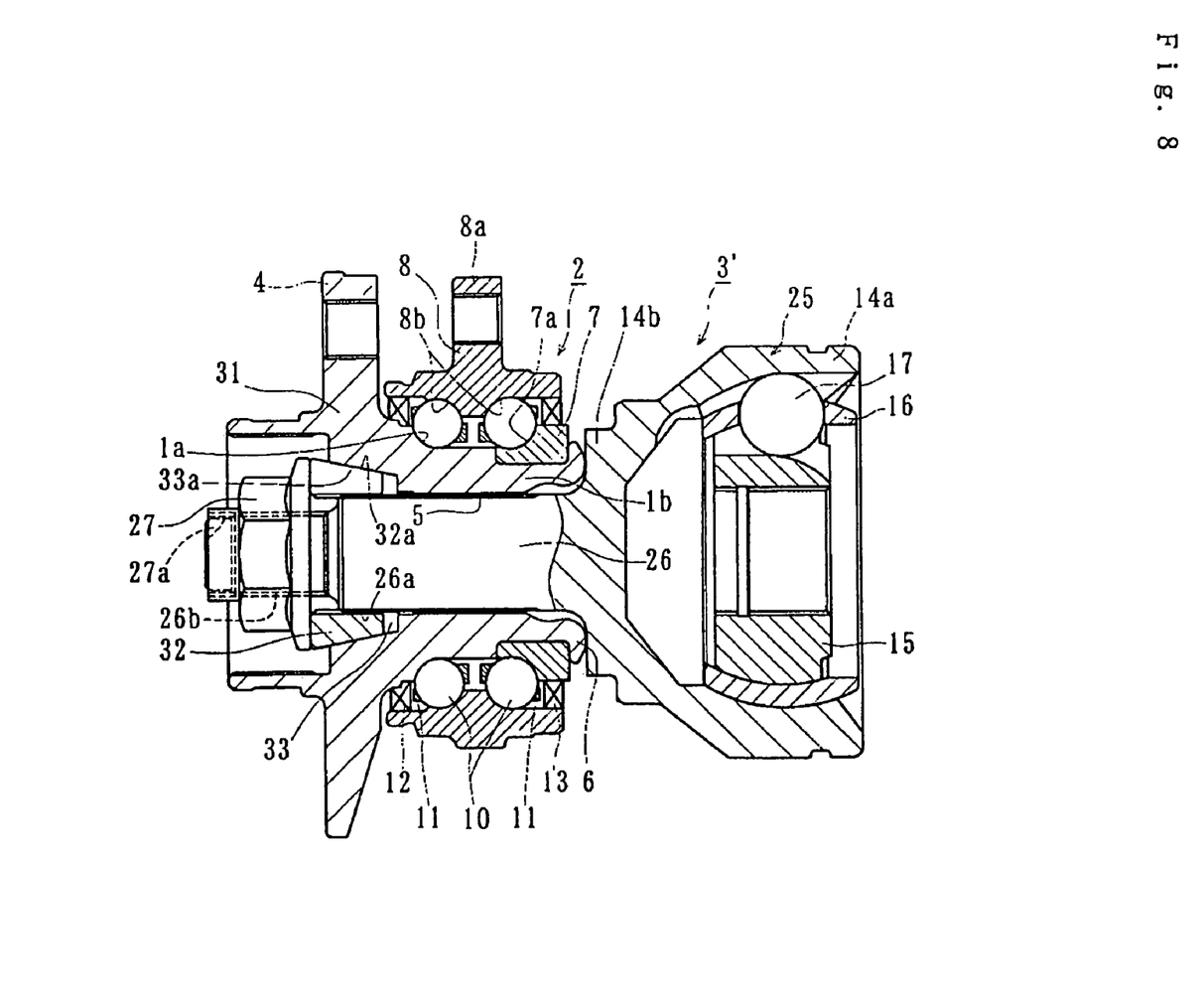
FIG. 8 is a longitudinal section view showing a third embodiment of the bearing apparatus for a driving wheel of the present invention.

FIG. 8 is a longitudinal section view showing a third embodiment of the bearing apparatus for a driving wheel of the present invention. The only difference between this embodiment and the first embodiment is in the structure of the stem portion of the outer joint member. Thus, like numerals are used to designate like structure in FIG. 8.

Figure 9:
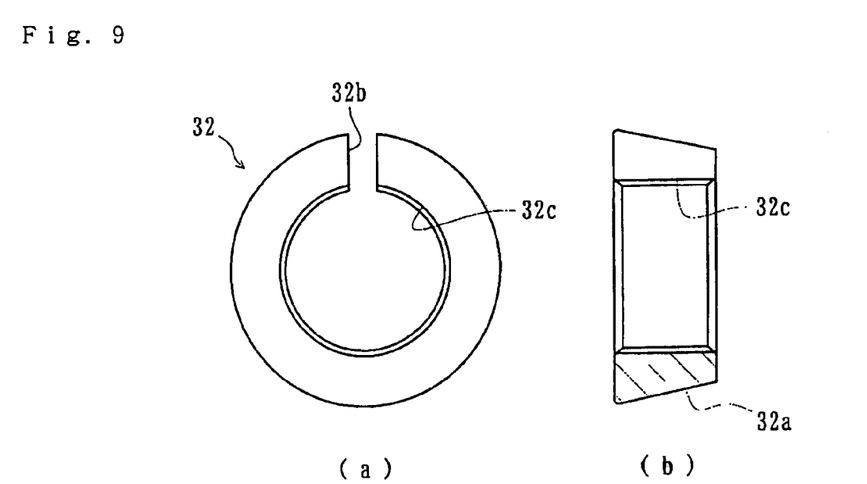
FIG. 9(a) is a front elevation view showing one embodiment of the fastening member of the present invention.
FIG. 9(b) is a cross section view thereof.

The stem portion 26 of the outer joint member 25 is formed with a serration (or spline) 26a at the circumferential surface. A threaded portion 26b is at the end. On the other hand, the outer end portion of the wheel hub 31 is formed with an annular recess 33 to receive a fastening member 32. The inner circumferential surface of the annular recess 33 is formed with a tapered surface 33a. The tapered surface has a taper angle larger than the wedge angle. The outer circumferential surface of the fastening member 32 is also formed with a tapered surface 32a corresponding to the tapered surface 33a. As shown in FIG. 9, the fastening member 32 is a split-ring having one slit on its circumference. The fastening member 32 has a serration 32c formed on its inner circumferential surface. The serration 32c engage a serration 26a of the stem portion 26.

As shown in FIG. 8, the securing nut 27 is screwed on the threaded portion 26b formed on the end portion of the stem portion 26. The fastening member 32 is moved axially inward and thus reduces its diameter by the tapered surface 33a of the wheel hub 31. Thus the serration 32c of the fastening member 32 is strongly fastened onto the serration 26a of the stem portion 26 to apply the pre-load to the fitted portion of the serrations 32c and 26a. Accordingly, circumferential backlash at the fitted portion can be eliminated.

The power from the constant velocity universal joint 3' is transmitted to the serration 32c of the fastener 32, via the serration 26a of the outer joint member 25, and then to the wheel hub 31, via the friction between the tapered surfaces 32a and 33a. If the power is large enough to overcome the friction, it can be transmitted to the wheel hub 31, via the serrations 26a and 5. In disassembling the bearing apparatus, the fastening member 32 can be easily removed from the wheel hub 31 by only removing the securing nut 27. This is due to the tapered surfaces 32a and 33a of the fastening member 32 and the wheel hub 31 being formed to have a tapered angle larger than the wedge angle.

Figure 10:
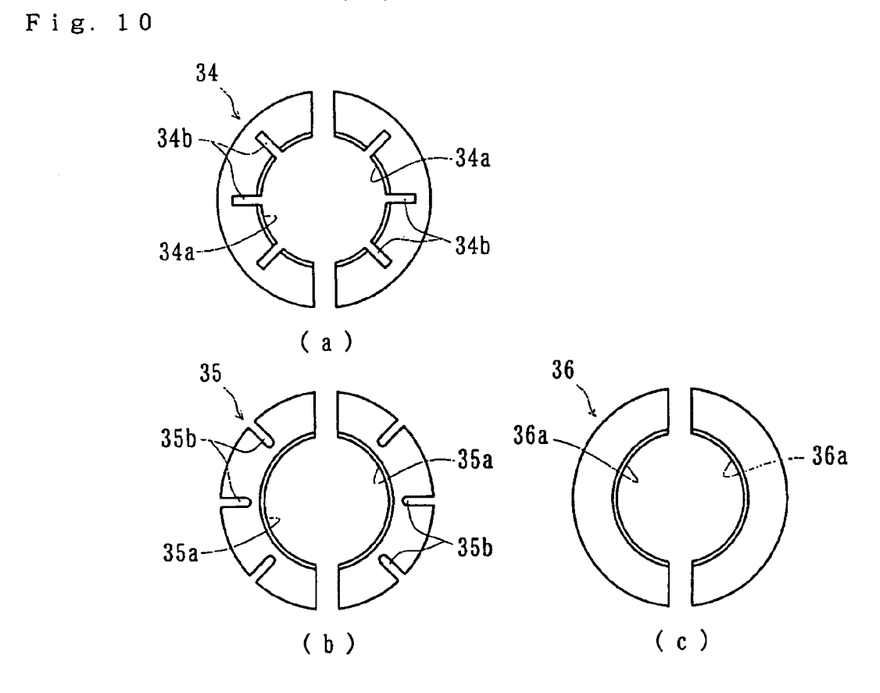

The fastening member 32 may be formed in many other configuration for example as shown in FIG. 10. It is of course that each of these fastening members has a tapered surface similar to that shown in FIG. 9.

A fastening member 34 shown in FIG. 10(a) has a two-piece structure in which a serration 34a and a plurality of slits 34b are formed on its inner circumferential surface. A fastening member 35 shown in FIG. 10(b) is also a two-piece structure with serration 35a formed on its inner circumferential surface and a plurality of slits 35b formed on its outer circumferential surface. A fastening member 36 shown in FIG. 10(c) is a simple two-piece structure with only a serration 36a formed on its inner circumferential surface. Other structure for example that separate into more than three pieces may be adopted.

As described above, since it is possible to obtain the pre-loaded fitted condition between the serration 26a of the stem portion 26 and the serration 32c of the fastening member 32 by fastening the securing nut 27 and reducing the diameter of the fastening member 32, it is possible to dispense with the helix angle on the serration 26a of the stem or to make the helix angle small. This further improves the working efficiency in the assembling or disassembling operation.

It is intended that the present invention is construed as including all alternations and modifications insofar as they come within the scope of the appended claims or their equivalent.

What is claimed is:

1. A bearing apparatus for a vehicle driving wheel comprising:
    a double row rolling bearing;
        a wheel hub integrally formed with a wheel mounting flange at one end and having a cylindrical stepped portion of smaller diameter axially extending from the other end of the wheel hub;
    an inner ring fitted on the stepped portion of the smaller diameter of the wheel hub, said inner ring being secured on the wheel hub through a caulked portion formed by plastically deforming the end of the stepped portion radially outwardly;
    an outer joint member having a shoulder adapted to be abutted to the end surface of the caulked portion and a stem portion axially extending from the shoulder, the outer joint member being inserted in the wheel hub via a serration fitted portion to attain a detachable engagement with the wheel hub;

a pre-loading means formed in the serration fitted portion between the stem portion of the outer joint member and the wheel hub;

a fastening means for combining the wheel hub and the outer joint member, said fastening means including a fastener and a bore in said outer joint member for receiving said fastener; and a releasing means adapted to be arranged on an inner surface of the wheel hub for removing the outer joint member from the wheel hub, said releasing means utilizing said bore for removing said outer joint member.

2. A bearing apparatus of claim 1 wherein the serration fitted portion is pre-loaded by providing the serration of the stem portion of the outer joint member with a helix angle of a predetermined angle relative to the axis of the stem portion.

3. A bearing apparatus of claim 1 wherein the outer end surface of the wheel hub is formed with an internal thread, and the wheel hub and the outer joint member are united using a plate having a circular aperture formed at a position corresponding to said internal thread and a central aperture formed with an internal thread, abutting the plate on said outer end surface of the wheel hub, and finally screwing a securing bolt into said internal thread formed in said shaft of the outer joint member through the central aperture of the plate.

4. A bearing apparatus of claim 1 wherein an elastic ring is fitted in an annular space formed between the end surface of the inner ring and the shoulder of the outer joint member, one end of a pulsar ring arranged on the shoulder of the outer joint member engaging the elastic ring.

* * * * *